Oct. 5, 1948.　　　　　H. E. BUCKLEN, 3D　　　　　2,450,780
ELECTRODE MOUNTING MEANS FOR
MERCURY SWITCHES AND RELAYS
Filed Feb. 15, 1946　　　　　　　　　　　　　2 Sheets-Sheet 1
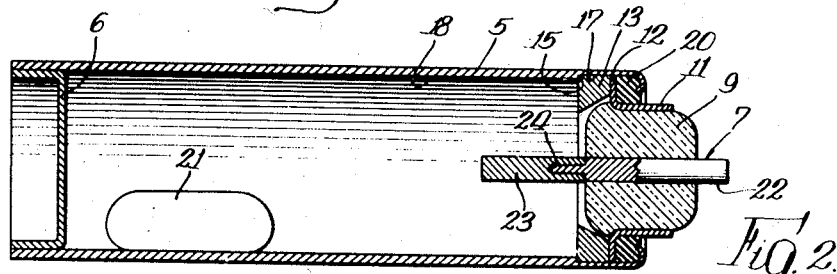
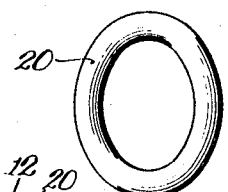
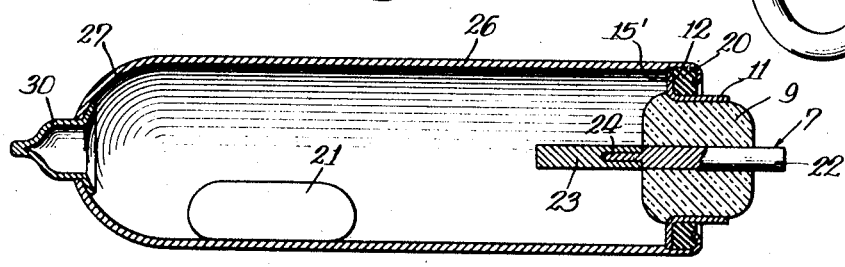
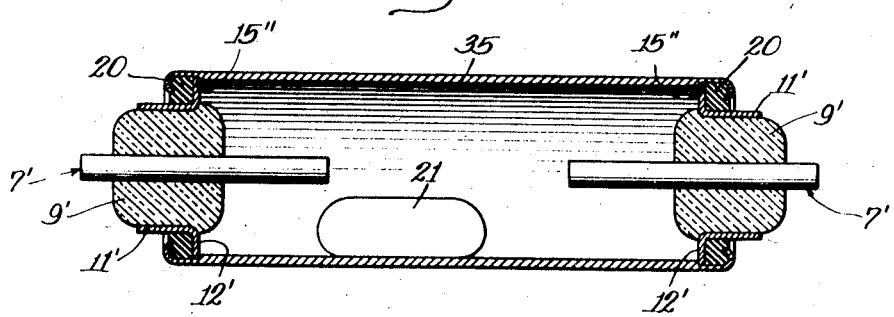
INVENTOR.
Herbert F. Bucklen III.
BY
Brown, Jackson, Boettcher & Dienner
Attys Oct. 5, 1948.  H. E. BUCKLEN, 3D  2,450,780
ELECTRODE MOUNTING MEANS FOR
MERCURY SWITCHES AND RELAYS
Filed Feb. 15, 1946  2 Sheets-Sheet 2
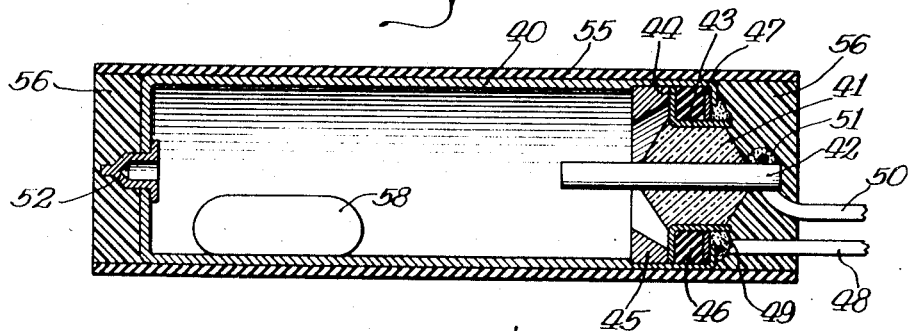
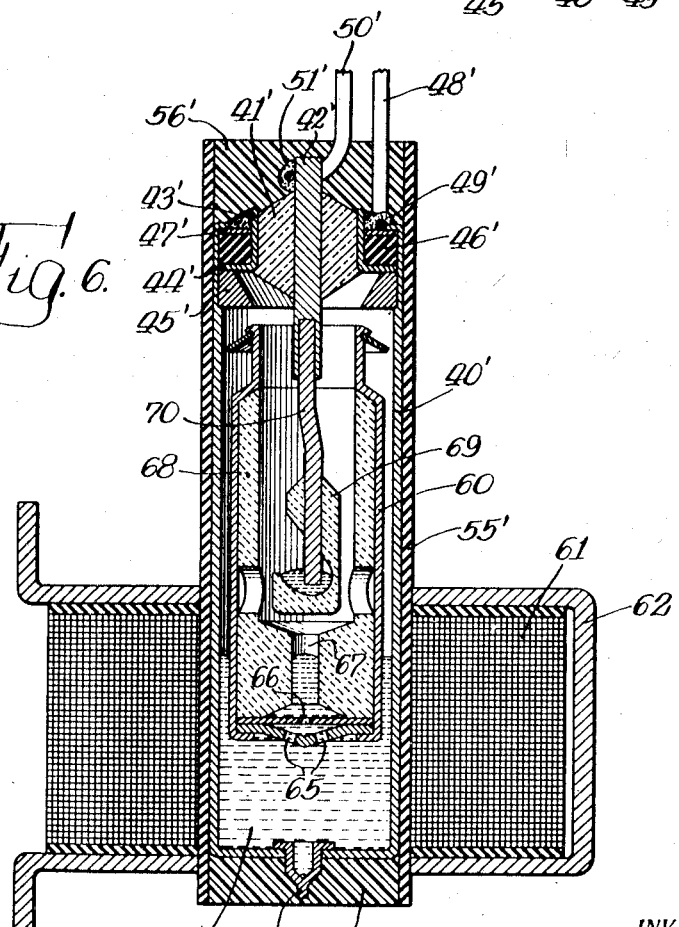
INVENTOR.
Herbert E. Bucklen III, Patented Oct. 5, 1948

2,450,780

UNITED STATES PATENT OFFICE 2,450,780

ELECTRODE MOUNTING MEANS FOR MERCURY SWITCHES AND RELAYS

Herbert E. Bucklen, III, Elkhart, Ind., assignor to Durakool, Inc., Elkhart, Ind., a corporation of Indiana Application February 15, 1946, Serial No. 647,867

8 Claims. (Cl. 200—152)

My present invention relates to an improvement in mercury switches and relays, and more particularly is concerned with means for assembling an electrode with the switch or relay casings.

The invention has particular application to mercury switches and relays of the metal casing or shell type for enclosing a body of mercury and having an electrode in case of a switch disposed in one or both ends thereof in insulated relation, or in case of a relay having an electrode extending into one end of the casing in insulated relation thereto, and in which the casing or shell of the switch or relay also forms an electrode. The invention is also applicable to mercury switches or relays in which a body of mercury is movable into or out of contact with a stationary body of mercury having contact with an electrode at an end of the casing, and other types of switches and relays in which an electrode is mounted in insulated relation in a metal casing.

Heretofore the most accepted practice of mounting of an electrode in one end of a metal casing has been accomplished by means of a gasket of resilient insulating material through which the electrode extends and which substantially fills the cross sectional area of the casing at one end thereof through which the electrode extends. This gasket is held under compression to provide a gas-tight seal between it and the electrode and the casing. This is accomplished by confining the gasket under compression between a suitable abutment inwardly of the end of the casing and by the spun-over end thereof to provide a seal between the electrode and casing. The gasket also served to insulate the electrode from the casing. This type of seal has proven unsatisfactory in that it does not provide an effective seal particularly between the gasket and electrode.

In the operation of mercury switches and relays considerable heat is frequently developed in the making and breaking of contact between the mercury and the electrode, and this heat is conducted by the electrode along its length. Continuous heating of the electrode soon has a deteriorating effect on the surrounding rubber gasket of the aforesaid seal so that it fails to serve its intended purpose. This destruction of the gasket is further disadvantageous in hydrogen filled casings since the hydrogen is permitted to escape and thus seriously impair satisfactory operations of the such mercury devices.

It is an object of my invention to provide an improved mercury switch or relay comprising a means for mounting an electrode in insulated gas-tight relation with a metal casing which is not subject to deterioration by heat generated in operation of the switch, and a means of resilient insulating material for mounting the first means in the metal casing in such a manner that it is not deleteriously affected by the generated heat.

Another object is to provide a mounting means comprising a glass bead in which the electrode is embedded in gas-tight insulated relation, and means including a resilient gasket providing for mounting of the glass bead in sealed relation with the metal casing.

A further object is to provide a mounting means comprising a glass bead in which the electrode is embedded in gas-tight insulated relation, a metal sleeve in which the bead is carried, and a resilient gasket means for mounting the metal sleeve in gas-tight relation with the metal casing.

A further object is to provide a mounting means as last aforesaid in which the metal sleeve and the glass bead carried therein have substantially the same coefficients of thermal expansion to prevent breaking away of the bead and sleeve over the range of temperatures to which they may be subjected to in the operation of a mercury switch or relay.

A further object is to provide a mounting means comprising a glass bead in which the electrode is embedded and an annular resilient gasket for mounting the bead in an open end of a metal casing together with a metal ring to which end and the electrode suitable leads are adapted to be secured with the annular gasket serving to prevent mercury from escaping internally of the switch and attacking the connection of the lead secured to the metal ring.

A further object is to form at least that part of the electrode embedded in the glass bead of a metal having substantially the same coefficient of expansion as the bead and sleeve to prevent their breaking away from each other, and resilient means for mounting the sleeve in sealed relation with the inner surface of the metal shell or casing of a mercury switch or relay.

A further object is to provide an electrode comprising one part made of a metal having substantially the same coefficient of thermal expansion as the glass bead in which it is embedded, and a second part which is adapted to extend internally of the metal casing to be contacted by the mercury being made of a metal having good electrical characteristics and especially good arc resisting properties.

A further object is to provide a mounting means for mounting an electrode in an open end of a metal casing, comprising a glass bead mounted in a metal sleeve through which bead an electrode extends in gas-tight insulated relation into the metal casing, an annular resilient gasket adapted to surround the sleeve carrying the glass bead, and an annular metal ring disposed between the gasket and the turned in end of the metal casing in which the electrode and annular metal ring are adapted to have suitable leads soldered or otherwise secured thereto, in which the resilient gasket prevents the leakage of mercury from internally of the casing to the aforesaid connections of either one or both of the leads.

In order to achieve the aforesaid objects, I propose to provide a unit comprising an electrode, a glass bead in which the electrode is embedded, and a metal sleeve in which the glass bead is carried. These several parts preferably are made of materials having the same thermal coefficients of expansion over the range of temperatures encountered in the operation of mercury switches and relays. In the preferred form of the invention the sleeve is formed with a substantially radially outwardly extending flange which is adapted to be seated on an abutment or shoulder formed internally of one end of the switch casing or shell. A resilient annular gasket of rubber, neoprene or plastic material having like characteristics is then positioned over the sleeve and upon the flange thereof and is caused to be compressed between the flange and the one end of the tube, as for example, by turning in or spinning over the open end of the casing. In this manner a seal is provided between the inner surface of the casing adjacent its one end and the sleeve. The glass bead possesses poor heat transmission characteristics so that heat developed in operation of the switch is not transmitted to the sealing gasket whereby the seal between the metal sleeve and the casing is vastly improved as compared with the seals of the prior art.

In one form of my invention I provide an electrode comprising two metal parts in which one part is made of a metal having substantially the same thermal coefficient of expansion as the glass bead in which the electrode is embedded, and having at its end extending within the switch casing for contacting the mercury made of a metal having good arc resisting characteristics such as molybdenum.

In another form of my invention I provide an annular metal ring between the turned in end of the metal casing and the annular resilient gasket. In this form of the invention the metal casing is preferably encased in a housing of insulating material and the electrode and annular metal ring have leads soldered thereto. The open end of the casing and enclosing housing is filled with suitable plastic material for sealing the end of the unit and through which sealing material the leads extend. In this form of the invention the annular gasket provides a seal which serves to prevent mercury from escaping internally from the casing and attacking the soldered connection of one of the leads with the annular metal ring.

Other objects and advantages of my invention will appear from the detail description.

Now, in order to acquaint those skilled in the art with the manner of utilizing and constructing devices in accordance with my invention, I shall describe in connection with the accompanying drawing certain preferred embodiments of my invention.

In the drawing:

Figure 1 is a longitudinal sectional view on a greatly enlarged scale of a mercury switch constructed in accordance with my invention;

Figure 2 is a perspective view of the resilient sealing gasket of my present invention;

Figure 3 is an enlarged longitudinal sectional view of another form of mercury switch constructed in accordance with my invention;

Figure 4 is an enlarged longitudinal sectional view of still another form of mercury switch constructed in accordance with my invention;

Figure 5 is an enlarged sectional view of still another form of mercury switch constructed in accordance with my invention in which the metal casing is housed in a shell of insulating material and in which the annular resilient gasket serves to prevent mercury internally of the switch from attacking a soldered connection of a lead for the switch with a metal contact ring disposed between the gasket and the turned in end of the metal casing; and Figure 6 is a vertical sectional view of a mercury relay embodying the seal of my present invention.

Referring now to Figure 1, I have shown a mercury switch comprising a metal casing or shell formed by a cylindrical tube 5 of stainless steel or other suitable metal in one end of which a cup-shape metal member 6 is secured as by welding of the peripheral flange thereof to the inner surface of the tube. The cylindrical metal tube 5 and the end cup member 6 together form what is commonly referred to in the art as an open envelope type of casing and through the open end of which an electrode 7 is adapted to extend. The electrode 7 is embedded in a glass bead 9 which in turn is carried in and fused to the inner surface of a metal sleeve 11. The electrode 7, the glass bead 9 and the sleeve 11 are first assembled into a unit before being mounted in the open end of the tube 5. The sleeve 11 at its inner end is provided with a radially outwardly extending flange 12, which flange is adapted to seat upon an annular steel washer or stop member 13, and which in turn seats upon an annular shoulder 15 preferably formed by the intersection of an enlarged counterbore 17 at the open end of the tube with the smaller normal bore 18 of the tube 5. The inner surface 19 of the annular washer or stop member 13 is formed as the surface of a cone with the apex thereof directed inwardly of the tube 5. In assembling the switch, the steel washer 13 together with the unit formed by the electrode 7, glass bead 9, and sleeve 11 are caused to occupy the positions shown in Figure 1, after which an annular resilient gasket 20, shown in detail in Figure 2, is positioned over the sleeve 11 and seated upon the flange 12 thereof. The annular gasket 20 has an internal diameter equal to or slightly greater than the diameter of sleeve 11 for fitting it over the sleeve. The open end of the tube 5 is then turned inwardly or spun over to compress the annular gasket 20 between the flange 12 of the sleeve 11 and the inturned end of the tube 5. The deforming stress exerted on the gasket 20 by the turned in end of the tube 5 exerts an end thrust against the radial flange 12 of the sleeve 11, and it in turn against the steel washer 13 into tight sealing engagement with the shoulder 15. The deforming stress imparted to the rubber gasket 20 by the turning in of the open end of the tube 5 forms a gas-tight seal between the inner surface of the tube 5 and the radial flange 12 of the sleeve 11. A body of mercury 21 is disposed within the tube 5 and by tilting of the switch casing the mercury 21 is adapted to engage the inwardly extending end of the electrode to establish a circuit through the tube 5 and the electrode 7.

In the form of the switch of my invention described above, the electrode 7 comprises two parts or members 22 and 23. The part 22 is embedded in the glass bead 9 and provides for connection of a lead to the electrode. This part 22 and the sleeve 11 preferably are made of an alloy known under the trade name of "Kovar" and the glass bead 9 is made of borosilicate glass. The "Kovar" alloy is well known in the art and it comprises approximately 25% nickel, 17% cobalt, 0.3% manganese and the balance of iron. The borosilicate glasses are also well known and are generally referred to in the art as hard glasses. The part 23 of the electrode 7 which extends inwardly of the tube 5 preferably is made of a metal having good arc resisting characteristics such as molybdenum.

The metal alloy "Kovar" and the borosilicate glasses have substantially the same coefficient of thermal expansion over the temperature range encountered in mercury switch operation so that by forming the part 22 of the electrode 7 of "Kovar" and the glass bead 9 of borosilicate glass, the rate and amount of expansion and contraction of these two elements will always be substantially the same avoiding the breaking away of these elements from each other. Also, in order to prevent breaking away of the glass bead 9 from the sleeve 11 it is preferable that the sleeve 11 also be made of "Kovar," or other similar metal. The "Kovar" alloy and glasses having substantially matching thermal coefficients are now well known in the art and in this connection reference may be had to United States Letters Patent No. 1,942,260, dated January 2, 1934; No. 1,942,261, dated January 2, 1934; No. 2,043,307, dated June 9, 1936; No. 2,062,335, dated December 1, 1936; No. 2,065,404, dated December 22, 1936; and No. 2,217,423, dated October 8, 1940, all issued to Howard Scott. Other alloys and glasses having these matching characteristics of thermal coefficients are also known in the art, and may be utilized in constructing the preferred forms of my invention.

The "Kovar" alloy and other similar alloys, as above referred to, do not generally possess good electrical characteristics such as resistance to destruction by arcing and would soon be destroyed if subjected to the continuous arcing occurring in the making and breaking of mercury switches and relays. For this reason the part 23 of electrode 7 extending internally of the switch casing to be engaged by the mercury is preferably made of molybdenum or other metal having like characteristics. As shown, the part 23 is provided with an internal bore 24 into which the reduced inner end of the part 22 extends with the end of the part 23 into which the bore extends seating against the inner end of the glass bead so that the mercury does not contact any portion of part 22.

In the embodiment shown in Figure 1, the molybdenum part 23 is of the same diameter as part 22 but the dimension of these parts may be varied if desired. For example, the diameter of part 23 could be greater to provide a larger contact area for the mercury. The annular resilient gasket 20 may be made of several different materials all of which have proven satisfactory. For example, it may be made of rubber, synthetic rubber of the type sold on the market under the trade-mark "neoprene," or other suitable plastic material having characteristics equivalent to the latter.

In the embodiment of my invention shown in Figure 3, the stainless steel casing 26 is formed with an integral semi-spherical end 27. Also, in this form of switch the annular steel washer 13 of Figure 1 has been omitted so that the flange 12 of sleeve 11 seats directly on the internal annular shoulder 15' formed adjacent the open end of shell 26. Thus, the gasket 20 imparts an end thrust to the flange 12 seating it against the shoulder 15' by turning in the open end of the shell 26 in the manner described in connection with Figure 1. Further, in the form of switch shown in Figure 3 I have provided a tubulation 30 welded to the semi-spherical end of the envelope 26 through which the mercury 21 may be introduced into the switch casing after the electrode 7' has been assembled therein. The tubulation also serves for evacuating the shell 26 and for filling the same with hydrogen. After these operations have been carried out the tubulation is then pinched closed and welded at its outer end to seal the switch. The use of such tubulation is now a well known expedient in the art and is thought that a further description of it is not essential to an understanding of the present invention. The unit comprising the electrode 7, glass bead 9 and sleeve 11 are the same as described in connection with the switch of Figure 1.

In Figure 4 I have shown still another modified form of mercury switch incorporating the sealing means of my invention to provide an electrode 7' at both ends of a metal casing 35 of stainless steel or the like. In this form of the invention a pair of electrodes 7' are mounted to extend inwardly from both ends of the tube 35 to provide a single phase double throw mercury switch. The electrodes 7' of this switch are formed only of molybdenum. I have found that in small switches in which the electrodes are of a diameter up to $\frac{1}{8}$" that they need not take the form of the two part electrodes of the switches of Figures 1 and 3 but may simply consist of molybdenum. Molybdenum electrodes up to the size indicated have been successfully incorporated in switches without breaking away thereof from the glass bead. The glass bead 9' and the sleeve 11' of these units are the same as previously described. In this form of switch the annular steel washer 13 has been omitted so that the flanges 12' of sleeves 11' seat directly on the shoulders 15'' inwardly of both ends of shell 35.

If it is desired to provide evacuated switches of the types above described in connection with Figures 1 and 4, this may be accomplished by inserting triethenolamine within the tubular members 18 and 35 before assembly of the electrodes therein, which after the switch is completed, burns upon arcing consuming the oxygen contained within the tubes 18 and 35, and creating a pressure of hydrogen therein. For small switches a drop or two of triethenolamine is sufficient for this purpose.

In the preferred form of my invention, as shown in Figure 1, the steel gasket 13 serves to absorb the inward end thrust upon turning in of the end of the switch and prevents the flange 12 of the sleeve 11 from being pushed into the shell itself. This is a preferred practice of utilizing my invention, but it will be understood that if care is exercised sleeve 11 of the form of the invention, as shown in Figures 3 and 4, may be used without the steel gasket 13.

The form of switch shown in Figure 5 as before comprises a stainless steel switch casing 40 in the open end of which an electrode unit comprising a glass bead 41 in which an electrode 42 is embedded is disposed adjacent the open end of the tube in the manner already described. The bead 41 is carried in a metal sleeve 43 which as before is provided with a radially outwardly extending flange 44 adapted to seat upon one end of a steel or metal stop member 45, which as before is seated upon an internal annular shoulder adjacent the open end of the casing 40. The bead 29, the sleeve 43 and the electrode 42 may be made of the materials previously referred to. In this form of the invention a metal annular ring 47 is adapted to be disposed between the annular resilient gasket 46 and the open end of the tube which when the edge of the open end of the tube is turned in or spun inwardly secures the ring 47 in the position shown. A gas-tight seal is then formed between the turned in end of the tube, the metal ring 47, and the sleeve 43 by an annular ring of solder 49 which extends from the outer periphery of the tube to the sleeve 43. A lead 48 is adapted to be secured to the tube by means of the ring of solder 49 to provide one lead for the switch. A second lead 50 is adapted to be soldered as at 51 to the outer end of the electrode 42. As before the closed end of the casing 40 has suitably secured therein a tubulation 52 for the purposes noted in the embodiment of the invention described in Figure 3. After the switch unit has been assembled as described it may be inserted into a cylindrical shell or enclosing cylindrical housing 55 formed of insulating material, such as "Bakelite" or other suitable plastic insulating material, the open ends of which are then filled with plastic sealing composition 56 to seal the metal casing in the housing 55. It will be observed that the leads 48 and 50 are embedded in the plastic sealing composition adjacent the open end of the casing of the switch and this sealing composition is of a character providing a fluid-tight seal between the several elements assembled within the open end of the casing 40 and the enclosing housing 55. In this form of the invention with the sealing composition 56 forming a fluid-tight seal, the resilient gasket 46 placed under compression as previously described serves to prevent the mercury 58 disposed within the tube from escaping beyond the gasket and attacking the soldered connection 49 of the lead 48. Thus in this form of the invention the resilient gasket 46 is not depended upon to form a gas-tight seal since as above noted this is achieved by the arrangement of the metal ring 47 between the turned in end of the tube and the ring of solder 49. As noted the annular resilient gasket 46 in this form of a switch structure thus merely serves to prevent mercury from escaping from internally of the casing 40 and attacking the ring of solder 49 for the lead 48 or the soldered connection of lead 50 of the switch.

In Figure 6 I have shown my invention embodied in a mercury relay in which the prime reference numerals of the relay of this figure indicate like or similar parts as described in connection with the mercury switch of Figure 5. The assembly of the metal casing 40' and of the arrangement of the glass bead 43', the electrode 42' and sleeve 43' are, as described, in connection with Figure 5. However, in this form of the invention the metal casing 50 is of suitable dimension to receive a plunger 60 disposed within the tube for rectilinear or vertical movement. Energizing coil 61 carried in a supporting bracket 62 surrounds the lower end of the tubular assembly of the casing 40' and enclosing housing 55', and upon energization of the coil the plunger is drawn downwardly displacing the mercury 64, which passes through metering orifices 65 and 66 through a lengthwise extending bore 67 at the lower end of the ceramic insert 68 contained within the plunger 60 to establish contact with mercury contained in a ceramic cup member 69 secured to an electrode extension member 70 which is secured in a bore formed in the inner end of the electrode 42'. The relay shown in Figure 6 comprising the arrangement of the plunger element and of the ceramic cup at the end of the electrode extension 69 forms the subject matter of my copending application Serial No. 656,571, filed March 23, 1946, to which reference may be had. It will be understood that the structure of the mercury relay of Figure 6 other than the arrangement of the mounting of the electrode 42' therein forms no part of the invention described in my present application and is merely illustrated to show the application of the sealing means of my invention to a mercury relay. As above related this relay forms per se the subject matter of my above referred to application the novel features of which are claimed and described in detail in that application.

While I have shown what I consider to be the preferred embodiments of my invention, it will be understood that various modifications and rearrangements may be made therein without departing from the spirit and scope of the invention.

I claim:

1. In a mercury switch or relay, the combination of a tubular metal casing for containing a body of mercury, a metal sleeve having a radially outwardly extending flange at one end, an electrode embedded in insulated gas-tight relation in a glass bead fused in said sleeve and adapted to be supported by said sleeve to extend inwardly of one end of said casing, an internal annular shoulder adjacent said one end of said casing providing a seat for the radial flange of said sleeve, and an annular resilient sealing member disposed about said sleeve between the flange thereof and said one end of said casing, said resilient sealing member being adapted to be held under compression against the flange of said sleeve in sealing engagement therewith and with the inner surface of said casing adjacent said one end by turning in thereof into engagement with said resilient sealing member, and said glass bead serving to prevent substantial transmission of heat from said electrode to said resilient sealing member developed by the making and breaking of contact of the body of mercury in said casing with said electrode.

2. The combination of claim 1 characterized by said sleeve and said glass bead having subtantially the same coefficients of expansion, and in which the part of said electrode embedded in said glass bead is made of metal having substantially the same coefficient of expansion as said sleeve and bead, and in which the part of said electrode extending into the casing is of molybdenum.

3. In combination, a tubular metal casing open at one end for containing a body of mercury, a metal sleeve having a substantially radially outwardly extending flange, a glass bead fused in said sleeve, an electrode embedded in said glass bead in insulated gas-tight relation and adapted to be supported by said sleeve to extend inwardly of the open end of said casing, abutment means internally of said casing adjacent its open end providing a seat for the flange of said sleeve, an annular resilient sealing member surrounding said sleeve at the side opposite the flange thereof adapted to have seating engagement with said abutment means, an annular metal member between said sealing member and the open end of said casing, and means for compressing said resilient member between said annular metal member and said flange of said sleeve into sealing engagement with said sleeve and the internal surface of said casing adjacent said sealing member to prevent escape of mercury from said casing therebetween.

4. In combination, a tubular metal casing open at one end, an electrode extending into the open end of said casing, a body of conducting fluid in said casing and movable therein for making and breaking a circuit between said casing and said electrode, means including a metal sleeve having a substantially annular flange through which said electrode extends in insulated relation, abutment means internally of said casing adjacent its open end providing a seat for the flange of said sleeve, an annular resilient sealing member surrounding said sleeve at the side opposite the flange thereof adapted to have seating engagement with said abutment means, an annular metal member between said sealing member and the open end of said casing, leads having soldered connection with said casing adjacent its open end and said electrode, and means for holding said resilient member under compression against the flange of said sleeve and the adjacent inner surface of said casing to prevent said conducting fluid from escaping internally of said casing therebetween to the soldered connections of said leads.

5. In combination, a tubular metal casing open at one end, an electrode extending into the open end of said casing, a body of conducting fluid in said casing and movable therein for making and breaking a circuit between said casing and said electrode, means including a metal sleeve having a substantially annular flange through which said electrode extends in insulated relation, abutment means internally of said casing adjacent its open end providing a seat for the flange of said sleeve, an annular resilient sealing member surrounding said sleeve at the side opposite the flange thereof adapted to have seating engagement with said abutment means, an annular metal member between said sealing member and the open end of said casing, said resilient member being adapted to be held under compression against the flange of said sleeve in sealing engagement therewith and the adjacent inner surface of said casing by turning in of the end of said casing into engagement with said annular metal member, an annular ring of solder between the periphery of the turned in end of said casing and said sleeve providing a gas-tight seal at said end, a lead secured to said end of said casing by said annular ring of solder, a second lead soldered to said electrode, a housing of insulating material open at one end adjacent which end the end of said casing through which the electrode extends is adapted to be disposed, and sealing means of insulating material for sealing said open end of said housing and through which sealing means said leads are embedded in insulated relation to extend externally of said housing.

6. In a mercury switch or relay, the combination of a tubular metal casing for containing a body of mercury, a metal sleeve having a radially outwardly extending flange at one end, an electrode embedded in insulated gas-tight relation in a glass bead fused in said sleeve and adapted to be supported by said sleeve to extend inwardly of one end of said casing, an internal annular shoulder adjacent said one end of said casing, an annular metal washer having seating engagement with said shoulder and providing a seat for the radial flange of said sleeve, and an annular resilient sealing member disposed about said sleeve between the flange thereof and said one end of said casing, said resilient sealing member being adapted to be held under compression against the flange of said sleeve in sealing engagement therewith and with the inner surface of said casing adjacent said one end by turning in of the latter into engagement with said resilient sealing member with the flange of said sleeve being biased into seating engagement with said annular metal washer and the latter into seating engagement with said annular shoulder of said casing.

7. The combination of claim 1 characterized by said tubular metal casing being of substantially uniform external diameter and having inner cylindrical surfaces of different diameters with the inner cylindrical surface of the greatest diameter being disposed adjacent said one end of the casing, and with the inner cylindrical surfaces forming at their intersection the internal annular shoulder at said one end of said casing providing the seat for the radial flange of said sleeve.

8. In combination, a tubular metal casing open at one end, a metal sleeve having a radially outwardly extending flange at one end, an electrode embedded in insulated gas-tight relation in a glass bead fused in said sleeve and adapted to be supported by the latter to extend inwardly of one end of said casing, abutment means internally of said casing adjacent said one end providing a seat for the radial flange of said sleeve, an annular resilient sealing member disposed about said sleeve at the side opposite the flange thereof adapted to have seating engagement with said abutment means, an annular metal member between said sealing member and the open end of said casing, said resilient sealing member being adapted to be held under compression against the flange of said sleeve in sealing engagement therewith and the adjacent inner surface of said casing by turning in of the end of said casing into engagement with said annular metal member, and a ring of solder between the periphery of the turned in end of said casing and said sleeve providing a gas-tight seal at said end.

HERBERT E. BUCKLEN, III.

REFERENCES CITED

The following references are of record in the file of this patent:

UNITED STATES PATENTS

| Number | Name | Date |
|---|---|---|
| 2,116,709 | Nippold | May 10, 1938 |
| 2,251,011 | Bear | July 29, 1941 |
| 2,355,482 | Suits | Aug. 8, 1944 |